(12) United States Patent
Stewart et al.

(10) Patent No.: US 10,097,394 B2
(45) Date of Patent: Oct. 9, 2018

(54) FILTERING IDENTIFIER FOR AN OFDM SYSTEM

(71) Applicant: THOMSON LICENSING, Issy les Moulineaux (FR)

(72) Inventors: John Sidney Stewart, Indianapolis, IN (US); Loic Fontaine, Noyal-sur-Vilaine (FR); Anthony Pesin, Chateaugiron (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/513,361

(22) PCT Filed: Sep. 21, 2015

(86) PCT No.: PCT/US2015/051167
§ 371 (c)(1),
(2) Date: Mar. 22, 2017

(87) PCT Pub. No.: WO2016/053661
PCT Pub. Date: Apr. 7, 2016

(65) Prior Publication Data
US 2017/0302488 A1    Oct. 19, 2017

(30) Foreign Application Priority Data
Sep. 29, 2014    (EP) .................................... 14306524

(51) Int. Cl.
*H04L 27/26*    (2006.01)
*H04J 11/00*    (2006.01)
(Continued)

(52) U.S. Cl.
CPC ........ *H04L 27/265* (2013.01); *H04J 11/0023* (2013.01); *H04L 27/264* (2013.01);
(Continued)

(58) Field of Classification Search
CPC .. H04L 27/265; H04L 27/264; H04J 11/0023; H04N 21/2383; H04N 21/438; H04N 21/6112
See application file for complete search history.

(56) References Cited

U.S. PATENT DOCUMENTS 8,259,786 B2    9/2012  Murali et al.
8,300,713 B2    10/2012 Hung et al.
(Continued)

FOREIGN PATENT DOCUMENTS

JP          5295955        6/2013
KR       20110135662      12/2011
(Continued)

OTHER PUBLICATIONS

Lee et al: "Performance Analysis of a Proposed Pre-FEC Structure for a DVB-C2 Receiver," IEEE Transactions on Broadcasting, vol. 59, No. 4, Dec. 1, 2013, pp. 638-647.

*Primary Examiner* — Syed Haider
(74) *Attorney, Agent, or Firm* — Joseph J. Opalach

(57) ABSTRACT

A broadcast TV signal is a DVB-T2 based system. A DVB-T2 transmitter checks OFDM symbols before transmission to determine a level of adjacent channel interference (ACI). If the of level of ACI is too high, i.e., above a threshold value, the OFDM symbols are filtered before transmission. Otherwise, the OFDM symbols are transmitted without filtering. A filtering field is added to an L1 pre-signaling table of the broadcast DVB-T2 signal to signal a DVB-T2 receiver when the received OFDM symbols have been filtered.

6 Claims, 10 Drawing Sheets

(51) Int. Cl.
  *H04N 21/2383*  (2011.01)
  *H04N 21/438*  (2011.01)
  *H04N 21/61*  (2011.01)

(52) U.S. Cl.
  CPC ....... *H04N 21/2383* (2013.01); *H04N 21/438* (2013.01); *H04N 21/6112* (2013.01)

(56) References Cited

U.S. PATENT DOCUMENTS

| | | | |
|---|---|---|---|
| 2007/0297379 A1 | 12/2007 | Gorokhov et al. | |
| 2009/0190641 A1 | 7/2009 | Yang | |
| 2011/0103280 A1* | 5/2011 | Liu | H04W 52/0229 370/311 |
| 2015/0071373 A1* | 3/2015 | Oh | H04L 27/2627 375/295 |
| 2016/0065390 A1* | 3/2016 | Kim | H04L 25/0224 375/260 |

FOREIGN PATENT DOCUMENTS

| | | |
|---|---|---|
| SG | 147957 | 9/2011 |
| WO | WO2007149997 | 12/2007 |
| WO | WO2012081869 | 6/2012 |

\* cited by examiner

FILTERING IDENTIFIER FOR AN OFDM SYSTEM

This application claims the benefit, under 35 U.S.C. § 365 of International Application PCT/US2015/051167, filed Sep. 21, 2015, which was published in accordance with PCT Article 21(2) on Apr. 7, 2016 in English and which claims the benefit of European application no. 14306524.1, filed Sep. 29, 2014.

BACKGROUND OF THE INVENTION

The present invention generally relates to communications systems and, more particularly, to a television (TV) system.

For Orthogonal Frequency Division Multiplexing (OFDM) style systems, data is transmitted in groups known as OFDM symbols. Each OFDM symbol is made up of some number of individual carriers that may have either the same, or different, modulation on each carrier. Since each OFDM symbol is different, they have different frequency characteristics. One example of such a system is a Digital Video Broadcast Terrestrial (DVB-T) style system such as DVB-T2. For a DVB-T2 system, the fast Fourier transform (FFT) for use in generating each OFDM symbol can have the following sizes: 1K, 2K, 8K, 16K or 32K (where K=1024), also referred to as carrier modes in DVB-T2, e.g., the 8K carrier mode. In addition, for the 8K, 16K or 32K FFT sizes, there can be a normal carrier mode and an extended carrier mode. In the extended carrier mode, additional carriers are added at both ends of the channel spectrum to allow for optimum use of the channel.

In any communications system various types of interference may be present such as inter-symbol interference (ISI), adjacent-channel interference (ACI), etc. In the context of an OFDM style system, ACI is interference caused by extraneous power from a transmitted signal into an adjacent channel (for DVB-T2, channel spacing may, e.g., be 8 MHz). Advantageously, for a DVB-T2 system, the larger the size of the fast Fourier transform (FFT) causes the spectrum of the transmitted signal to roll off more rapidly outside the channel band—thus limiting the effects on an adjacent channel. In addition, there is typically an analog RF (radio frequency) filter before the transmission antenna to further limit the effects of the transmitted signal on an adjacent channel.

Notwithstanding the above, there may still be instances of ACI even in a DVB-T2 system. One known solution is by offsetting channels. For example, if there are three adjacent channels, A, B and C and there was potential interference between, e.g., channels A and B, this could be resolved by offsetting B towards C. However, this may then cause a conflict between channels B and C.

SUMMARY OF THE INVENTION

We have realized another way to further reduce the effects of ACI without having to offset channels. In particular, each OFDM symbol could be further filtered in some way so that the signal does not interfere with adjacent channels. However, further filtering of an OFDM signal can cause some distortion in the OFDM symbol which could reduce performance. Therefore, and in accordance with the principles of the invention, selective filtering of each OFDM symbol is performed. Illustratively, each OFDM symbol is checked before transmission to determine a level of ACI. The level of ACI caused by the current OFDM symbol can be found by estimating the level of signal power that falls into the adjacent channel. This can be done digitally by simulating a typical transmitter amplifier and transmitter output filter followed by a typical receiver filter for the adjacent channel. The amount of signal power that is seen in the simulated receiver is an estimate of the level of transmitted ACI. If the level of ACI is too high, the OFDM symbol is filtered before transmission. Otherwise, the OFDM symbol is transmitted without filtering. The use of the filter is signaled as part of signaling information, e.g., L1 signaling information in a DVB-T2 style system, to alert the receiver to compensate for the use of a filter on any received OFDM symbols. As a result, filtering distortion in an OFDM symbol is reduced by only filtering when needed to prevent ACI.

In an illustrative embodiment of the invention, the broadcast TV signal is a DVB-T2 based system. The DVB-T2 transmitter checks OFDM symbols before transmission to determine a level of ACI. If the of level of ACI is too high, i.e., above a threshold value, the OFDM symbols are filtered before transmission. Otherwise, the OFDM symbols are transmitted without filtering. A filtering field is added to an L1 pre-signaling table of the broadcast DVB-T2 signal to signal a DVB-T2 receiver when the received OFDM symbols have been filtered. In accordance with a feature of the invention, the filtering field may also convey the type of filtering that was performed on the OFDM symbol.

In another illustrative embodiment of the invention, a DVB-T2 receiver comprises an OFDM receiver for receiving an OFDM broadcast signal, the received OFDM broadcast signal conveying frames, each frame comprising a preamble portion and a following data portion; wherein at least one preamble portion conveys information to the receiver if a following data portion has been filtered prior to transmission; and a processor, responsive to the information if a following data portion has been filtered prior to transmission, for controlling a filter to process the following data portion to compensate for the filtering prior to transmission. In accordance with a feature of the invention, the preamble portion conveying the information is a part of the DVB-T2 L1 pre-signaling table.

In view of the above, and as will be apparent from reading the detailed description, other embodiments and features are also possible and fall within the principles of the invention.

DETAILED DESCRIPTION

Figure 1:
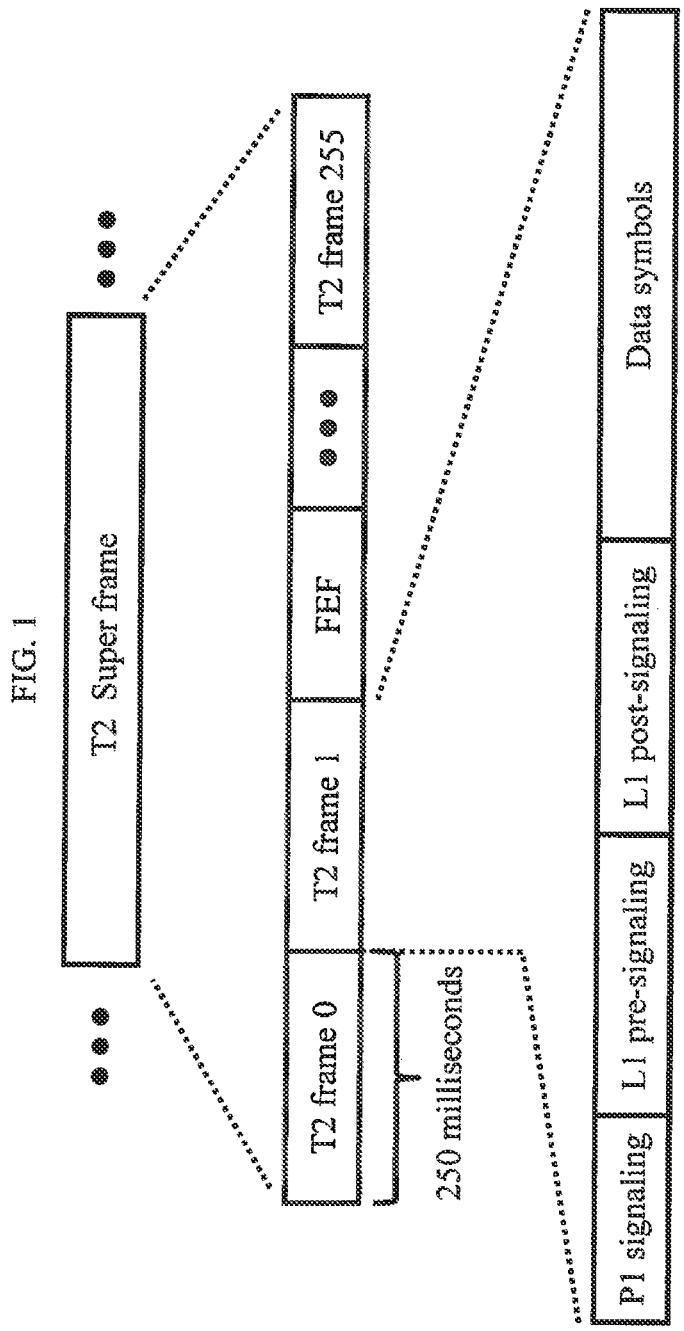
FIG. 1 shows an illustrative DVB-T2 compatible signal format in accordance with the principles of the invention.

Other than the inventive concept, the elements shown in the figures are well known and will not be described in detail. For example, other than the inventive concept, a set-top box or digital television (DTV) and the components thereof, such as a front-end, Hilbert filter, carrier tracking loop, video processor, remote control, etc., are well known and not described in detail herein. In addition, other than the inventive concept, familiarity with networking, OFDM and current and proposed recommendations for TV standards is assumed and not described herein. Such as, e.g., NTSC (National Television Systems Committee); PAL (Phase Alternation Lines); SECAM (SEquential Couleur Avec Memoire); ATSC (Advanced Television Systems Committee) (e.g., ATSC Standard: Program and System Information Protocol for Terrestrial Broadcast and Cable (PSIP) Document A/65); Chinese Digital Television System (GB) 20600-2006; Digital Video Broadcasting (DVB-T2) and DVB-H. In particular, familiarity with the following DVB-T2 standards is assumed: ETSI EN 302 755 V1.3.1: Digital Video Broadcasting (DVB); Frame structure channel coding and modulation for a second generation digital terrestrial television broadcasting system (DVB-T2); ETSI TS 108 831 V1.2.1: Digital Video Broadcasting (DVB); Implementation Guidelines for a second generation digital terrestrial television broadcasting system (DVB-T2); ETSI TS 102 992: Digital Video Broadcasting (DVB); Structure and modulation of optional transmitter signatures (T2-TX-SIG) for use with the DVB-T2 second generation digital terrestrial television broadcasting system; and ETSI EN 300 468: Digital Video Broadcasting (DVB); Specification for Service Information (SI) in DVB systems. It should also be noted that the inventive concept may be implemented using conventional programming techniques, which, as such, will not be described herein. Finally, like-numbers on the figures represent similar elements.

As noted above, we have realized another way to further reduce the effects of ACI without having to offset channels. In particular, each OFDM symbol could be further filtered in some way so that the signal does not interfere with adjacent channels. However, further filtering of an OFDM signal can cause some distortion in the OFDM symbol which could reduce performance. Therefore, and in accordance with the principles of the invention, selective filtering of each OFDM symbol is performed. Illustratively, each OFDM symbol is checked before transmission to determine a level of ACI. If the of level of ACI is too high, the OFDM symbol is filtered before transmission. Otherwise, the OFDM symbol is transmitted without filtering. The use of the filter is signaled as part of the signaling information, e.g., L1 signaling information in a DVB-T2 style system, to alert the receiver to compensate for the use of a filter on any received OFDM symbols. As a result, filtering distortion in an OFDM symbol is reduced by only filtering when needed to prevent ACI.

An illustrative embodiment of the invention will now be described in the context of a DVB-T2 system. In current DVB-T2 style systems, there is a preamble that is sent before the main OFDM data symbols. A DVB-T2 compatible signal format in accordance with the principles of the invention is illustrated in FIG. 1. As shown in FIG. 1, a DVB-T2 compatible signal format is comprised of a sequence of super frames (as represented by the ellipses), each super frame comprising, at most, 256 T2 frames (numbered from 0 to 255). Each T2 frame is, at most, 250 milliseconds long. In addition, each superframe may also comprise one, or more, Future Extension Frames (FEFs). Each T2 frame carries P1 signaling, L1 pre-signaling, L1 post signaling and data symbols for the physical layer pipes (PLPs) (e.g., see ETSI EN 302 755 and ETSI TS 102 831). The PLPs carry the services, e.g., programs for viewing by a user. As illustrated in FIG. 1, the L1 pre-signaling data is transmitted as a part of the preamble in the initial part of a T2 frame before the data symbols.

Figure 2:
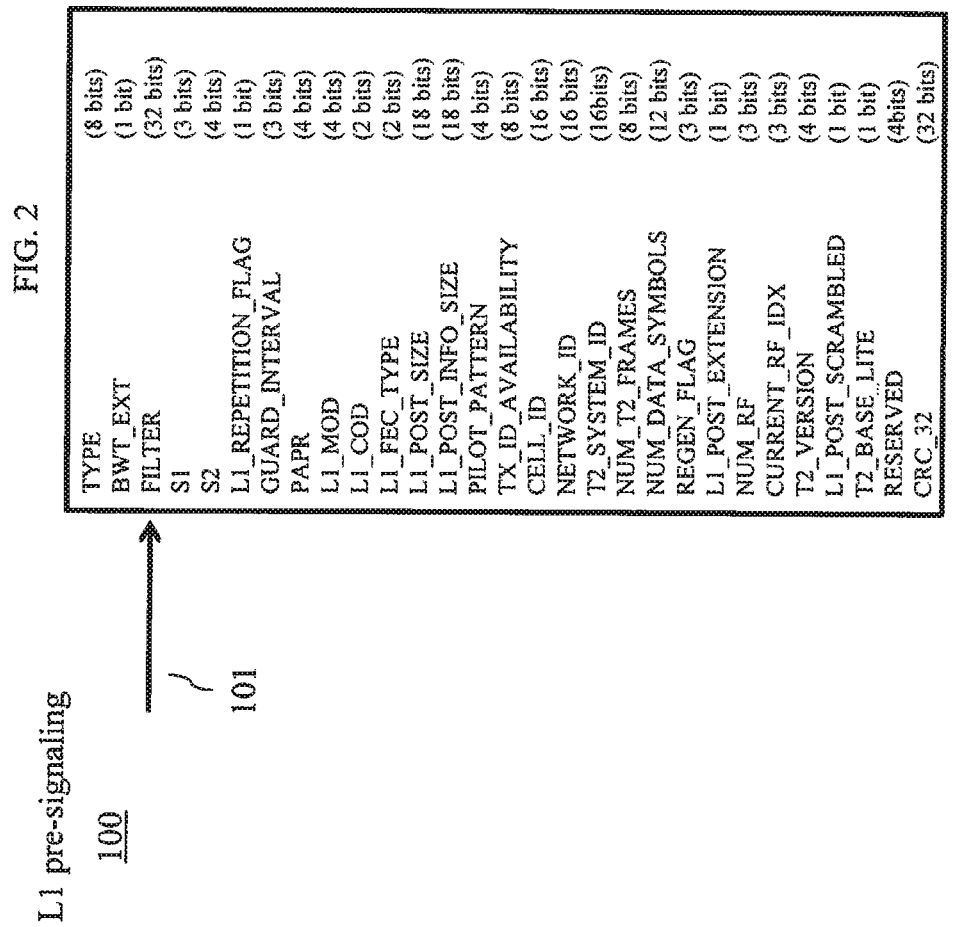
FIG. 2 shows an illustrative DVB-T2 L1 pre-signaling table in accordance with the principles of the invention.

In accordance with the principles of the invention, the L1 pre-signaling data of FIG. 1 is modified to include a FILTER field, which is used to signal to a DVB-T2 receiver whether the following OFDM symbols have had a filter applied or not before transmission. As shown in FIG. 2, the L1 pre-signaling table 100 of DVB-T2 is modified to now include a FILTER field with a length of 32 bits as indicated by arrow 101. Illustratively, this 32-bit field represents a binary value, e.g., a value of zero is associated with no filtering and a non-zero value is associated with filtering. It should also be noted that other variations are possible, for example, a value of zero is still associated with no filtering, but particular non-zero values indicate the particular type of filtering applied to the OFDM symbol.

Figure 3:
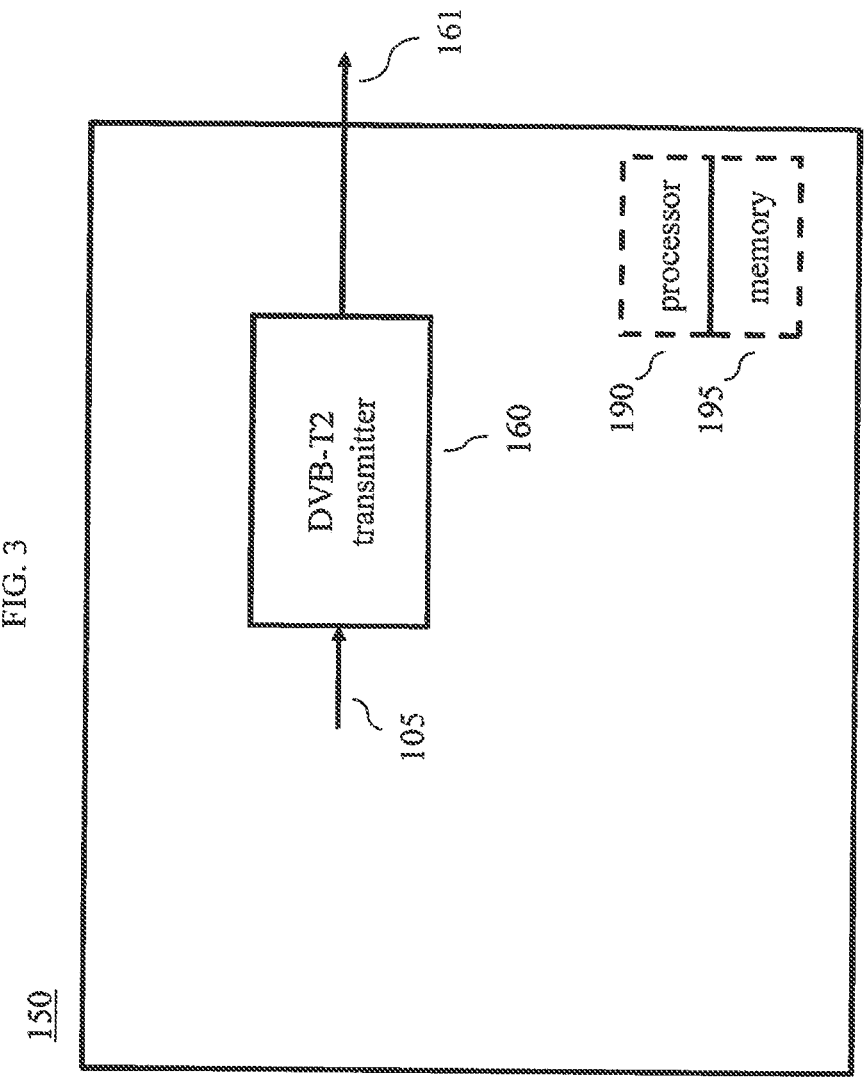
FIG. 3 shows an illustrative transmitter in accordance with the principles of the invention.

Referring now to FIG. 3, an illustrative embodiment of a transmitter 150 in accordance with the principles of the invention is shown. Only that portion of transmitter 150 relevant to the inventive concept is shown, e.g., the processing of data 105. The later represents a sequence of information for T2 frames, i.e., the P1 signaling, L1 pre-signaling and data symbols as illustrated in FIG. 1. The L1 pre-signaling portion of data 105 is modified to include the FILTER field as shown in FIG. 2. As noted earlier, this FILTER field indicates to a DVB-T2 style receiver whether or not the following OFDM symbols have been filtered. Other than the inventive concept, transmitter 150 conforms to DVB-T2 standards, e.g., see the DVB-T2 implementation guidelines described in ETSI TS 102 831 and ETSI EN 302 755. Transmitter 150 is representative of any processor-based platform for transmission of a signal. In this regard, transmitter 150 includes one, or more, processors and associated memory as represented by processor 190 and memory 195 shown in the form of dashed boxes in FIG. 3. In this context, computer programs, or software, (e.g., representing the flow charts of FIGS. 5 and 7) are stored in memory 195 for execution by processor 190. The latter is representative of one, or more, stored-program control processors and these do not have to be dedicated to the transmitter function, e.g., processor 190 may also control other functions of transmitter 150. Memory 195 is representative of any storage device, e.g., random-access memory (RAM), read-only memory (ROM), etc.; may be internal and/or external to transmitter 150; and is volatile and/or non-volatile as necessary. Transmitter 150 comprises DVB-T2 transmitter 160. The latter is representative of the coding, framing, modulation, etc., in DVB-T2. For this example, it is assumed that an 8K carrier mode is used. Any or all of these components may be implemented in software as represented by processor 190 and memory 195. Finally, DVB-T2 transmitter 160 selectively filters the OFDM symbols and provides a signal 161 for transmission via an antenna (not shown).

Figure 4:
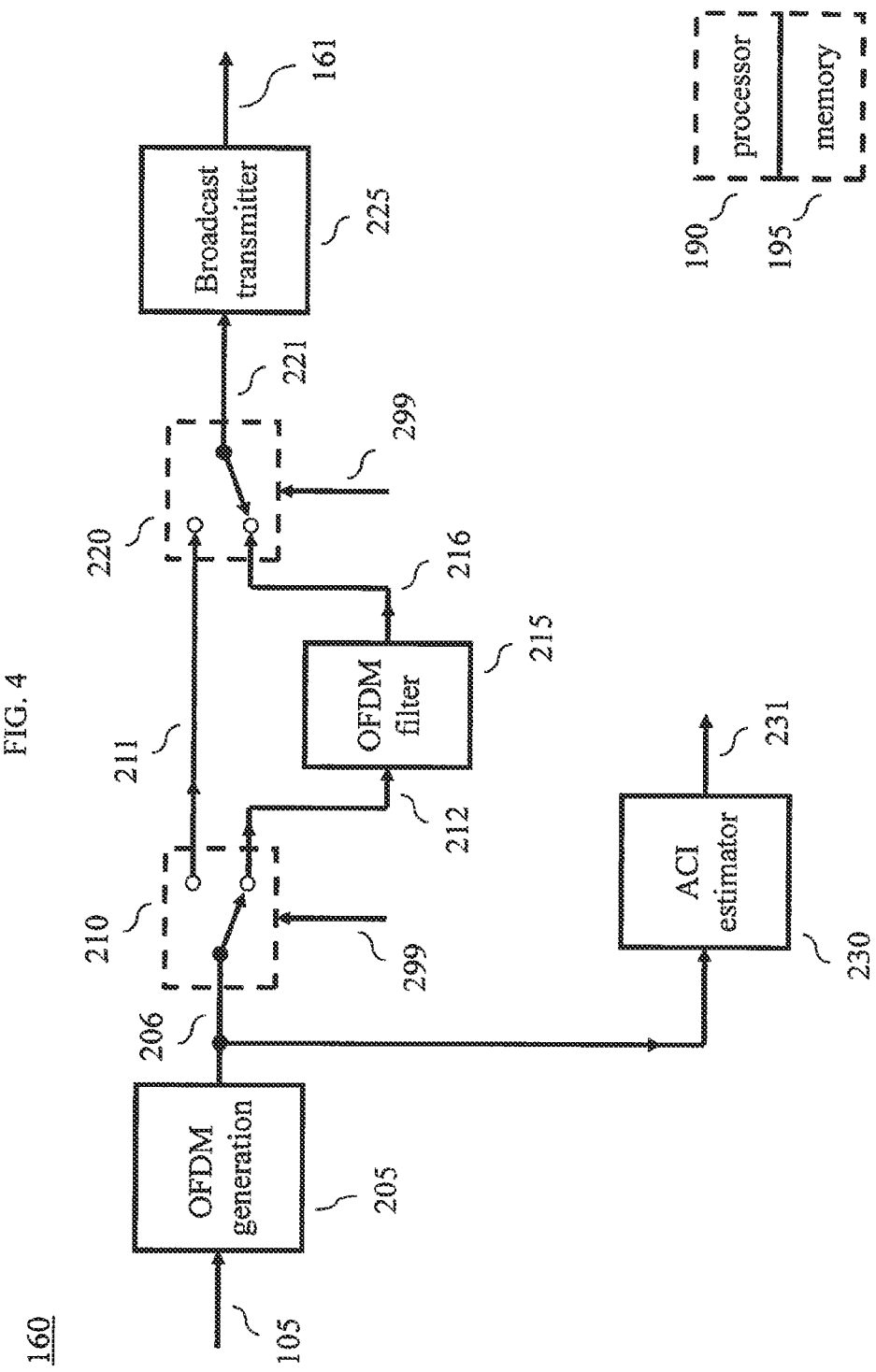
FIG. 4 shows a portion of an illustrative DVB-T2 transmitter in accordance with the principles of the invention.

Turning now to FIG. 4 an illustrative embodiment of the invention is shown for selectively filtering the OFDM symbols. Only that portion of DVB-T2 transmitter 160 relevant to the inventive concept is shown. DVB-T2 transmitter 160 comprises OFDM generation element 205, switches 210 and 220, OFDM filter 215, ACI estimator 230 and broadcast transmitter 225. Illustratively, it is assumed that switch 210 includes a buffer (not shown) for storing a DVB-T2 frame while ACI estimator 230 processes that frame to determine the presence of ACI before transmission. As noted above for FIG. 3, one, or more, of the functions of FIG. 4 can be implemented in software via processor 190 and memory 195. OFDM generation element 205 receives data 105 and provides OFDM symbols 206 as known in the art formatted in T2 Super frames as shown in FIG. 1. OFDM symbols 206 is applied to ACI estimator 230, which estimates the amount of adjacent channel interference for the OFDM symbols and provides an ACI indicator 231 (described further below) to processor 190. ACI estimator 230 can determine the level of ACI caused by the current OFDM symbol by estimating the level of signal power that falls into the adjacent channel. This can be done digitally by simulating a typical transmitter amplifier and transmitter output filter followed by a typical receiver filter for the adjacent channel. The amount of signal power that is seen in the simulated receiver is an estimate of the level of transmitted ACI. If ACI indicator 231 indicates the possible presence of ACI, processor 190 controls switch 210 via control signal 299 to apply OFDM symbols 206 to OFDM filter 215 via signal path 212. It is assumed that OFDM filter 215 is a digital filter. OFDM filter 215 provides OFDM filtered symbols 216 to switch 220, which also under the control of control signal 299, provides the OFDM filtered symbols 216 to broadcast transmitter 225 via signal path 221. OFDM filter 215 represents the additional filtering of OFDM symbols in accordance with the principles of the invention. As noted earlier, it could be the case that OFDM filter 215 is a bank of different filters, where each filter in the bank is selected based on the amount of estimated ACI provided by ACI estimator 230. As another example, there could a different filter for the different carrier modes of the DVB-T2 signal.

On the other hand, if ACI indicator 231 does not indicate the possible presence of ACI, processor 190 controls switches 210 and 220 via control signal 299 such that OFDM symbols 206 are applied to broadcast transmitter 225 without filtering. Broadcast transmitter 225 receives the OFDM symbols (filtered or not) via signal path 221 and upconverts the signal to a particular radio frequency (rf) channel and provides the signal 161 for transmission via an antenna (not shown). Broadcast transmitter 225 may additional filter the rf signal in the analog domain before broadcast.

As noted above, Elements 210 and 220 are designated as switches. However, it should be noted that these do not have to be actual switches and, rather, provide a visual illustration of a switching function for ease of explanation. For example, it may be the case that instead of switching the path of signal processing for OFDM symbols 206, additional processing is performed by processor 190 to filter the OFDM symbols to implement the function of OFDM filter 215 in accordance with the principles of the invention.

Figure 5:
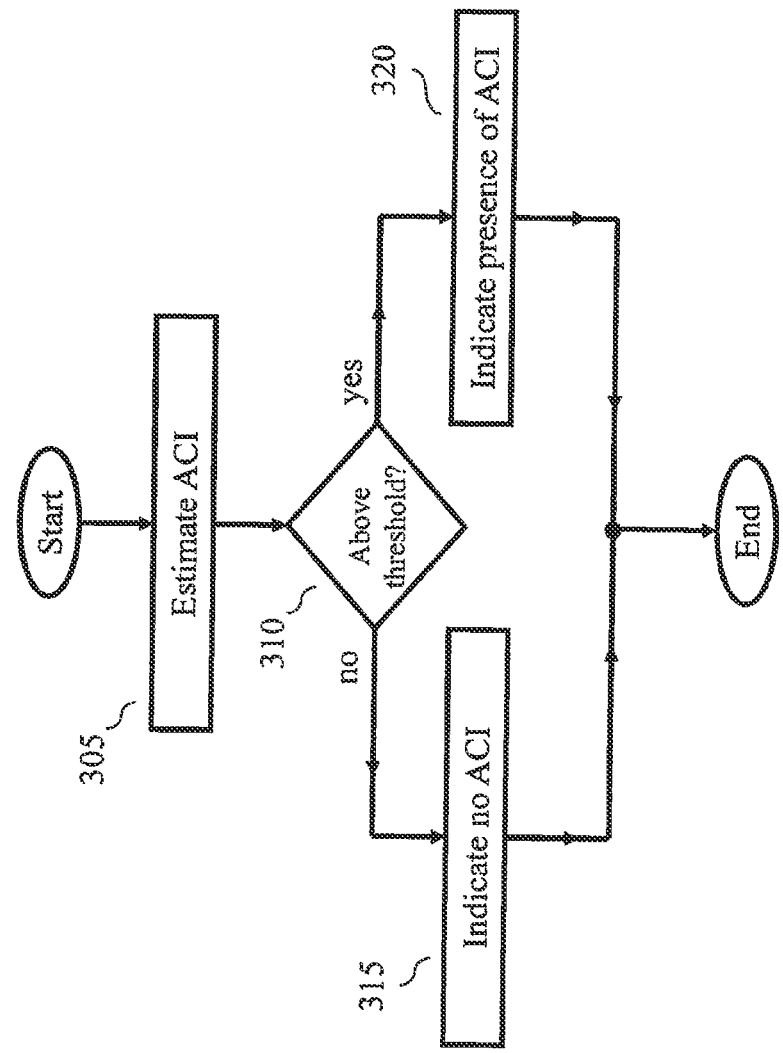
FIG. 5 shows an illustrative flow chart for use in a DVB-T2 transmitter in accordance with the principles of the invention.
Figure 6:
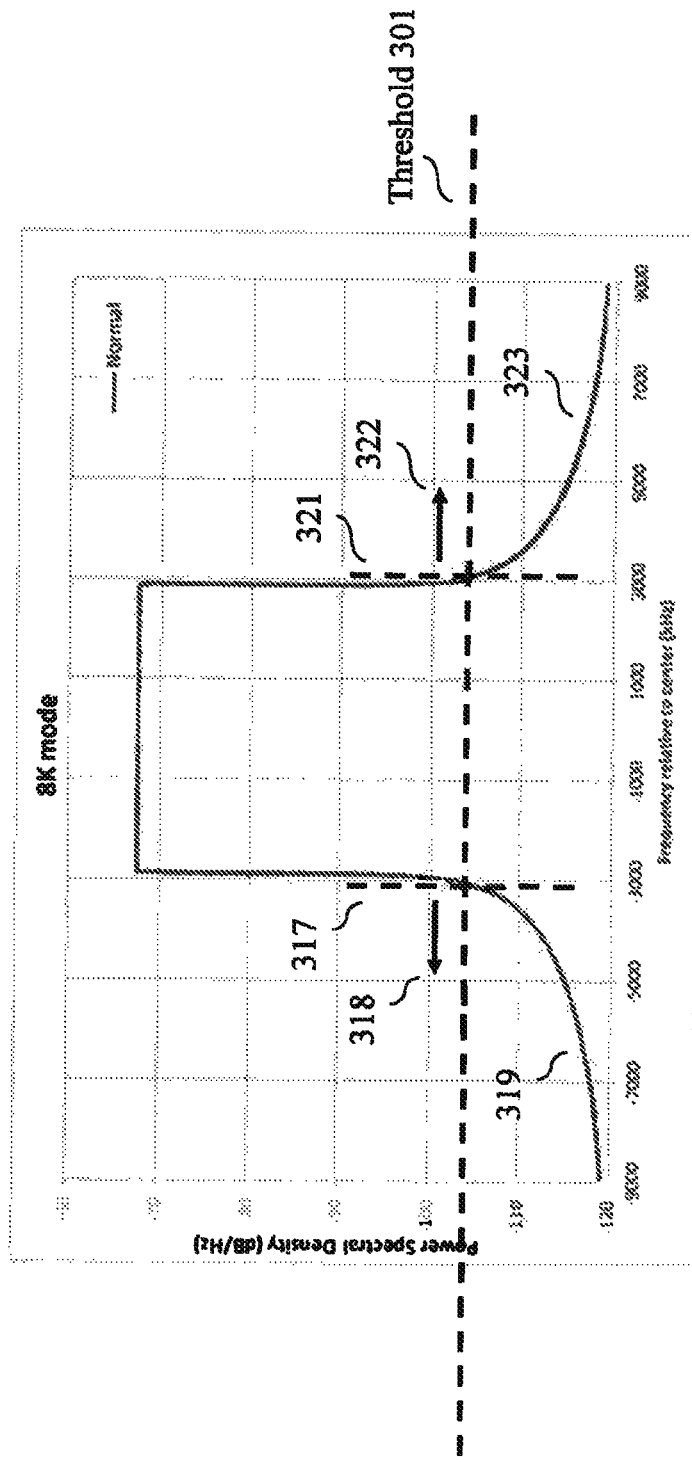
FIG. 6 shows an illustrative threshold for use in a DVB-T2 transmitter in accordance with the principle of the invention.

Referring now to FIG. 5, an illustrative flow chart is shown for use in ACI estimator 230. In step 305, ACI estimator 230 estimates a possible level of ACI for OFDM symbols 206. In step 310, ACI estimator 230 compares the estimated level of ACI to a threshold value for sidebands of the signal. If the estimated level of ACI for the sidebands is above the threshold value, then ACI estimator 230 indicates the possible presence of ACI, via signal 231, to processor 190 in step 315. On the other hand, if the estimated level of ACI for the sidebands is below, or equal to, the threshold value, then ACI estimator 230 indicates the lack of ACI, via signal 231, to processor 190 in step 320. Turning briefly to FIG. 6, an illustrative threshold 301 is shown. For frequencies to the right of dashed line 321 in the direction of arrow 322, a comparison is made to threshold 301, i.e., the right sideband. In FIG. 6, the signal in this frequency range (indicated by label 323) is illustratively below threshold 301 and there is no ACI. Similar comments apply to the left sideband as indicated by dashed line 317, arrow 318 and label 319.

Figure 7:
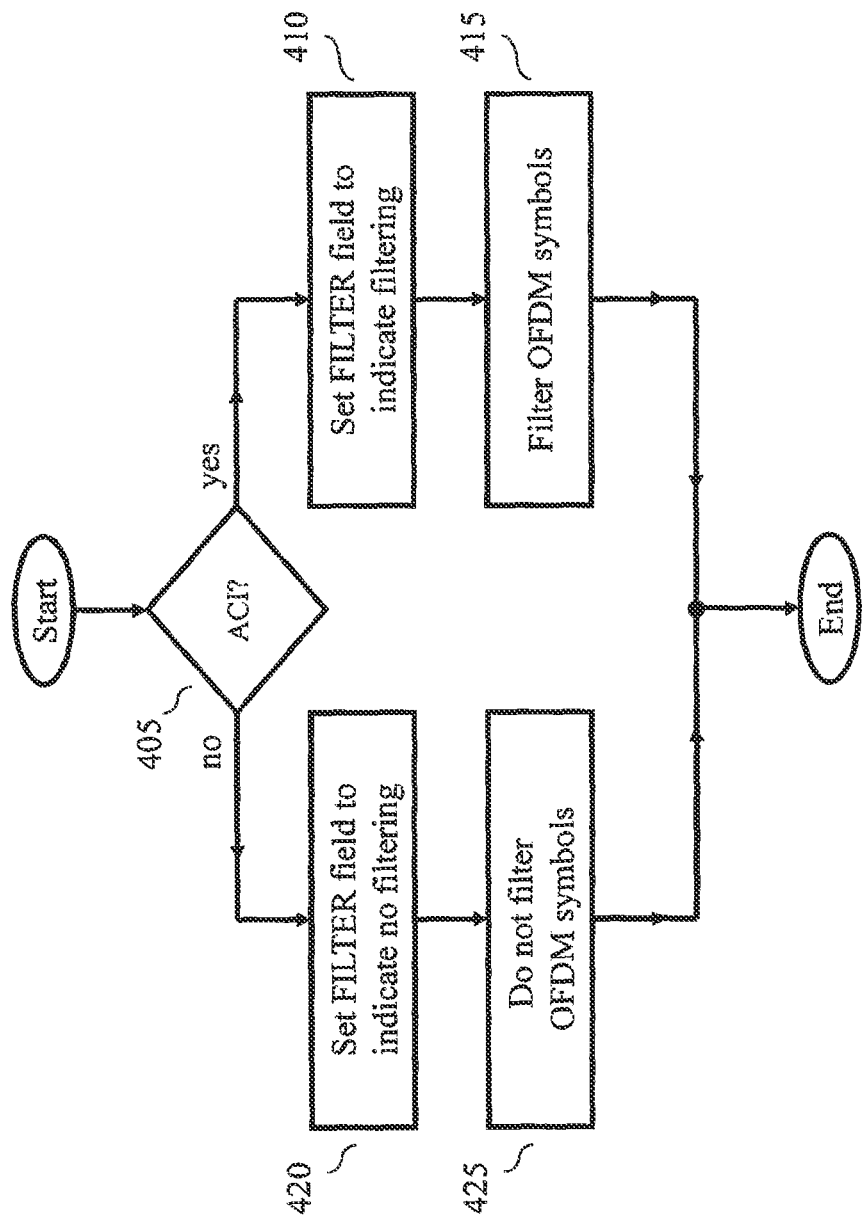
FIG. 7 shows an illustrative flow chart for use in a DVB-T2 transmitter in accordance with the principles of the invention.

Turning now to FIG. 7, another illustrative flow chart is shown for use by processor 190 in accordance with the principles of the invention. In step 405, processor 190 checks for the presence of ACI as signaled by ACI estimator 230. If ACI has been detected, processor 190 sets the FILTER field in the L1 pre-signaling table to indicate filtering of the OFDM symbols in step 410. Then, in step 415, processor 190 controls switches 210 and 210 such that OFDM symbols 206 are filtered by OFDM filter 215 before application to broadcast transmitter 225. On the other hand, if ACI has not been detected, processor 190 sets the FILTER field in the L1 pre-signaling table to indicate no filtering of the OFDM symbols in step 420. Then, in step 425, processor 190 controls switches 210 and 210 such that OFDM symbols 206 are not filtered by OFDM filter 215 before application to broadcast transmitter 225. It should be noted that the order of steps 410 and 415; and steps 420 and 425, are irrelevant, e.g., step 415 can begin before step 410.

In view of the above, and in accordance with the principles of the invention, a DVB-T2 style transmitter selectively filters the OFDM symbols before transmission. As a result, filtering distortion in an OFDM symbol is reduced by only filtering when needed to prevent ACI.

Figure 8:
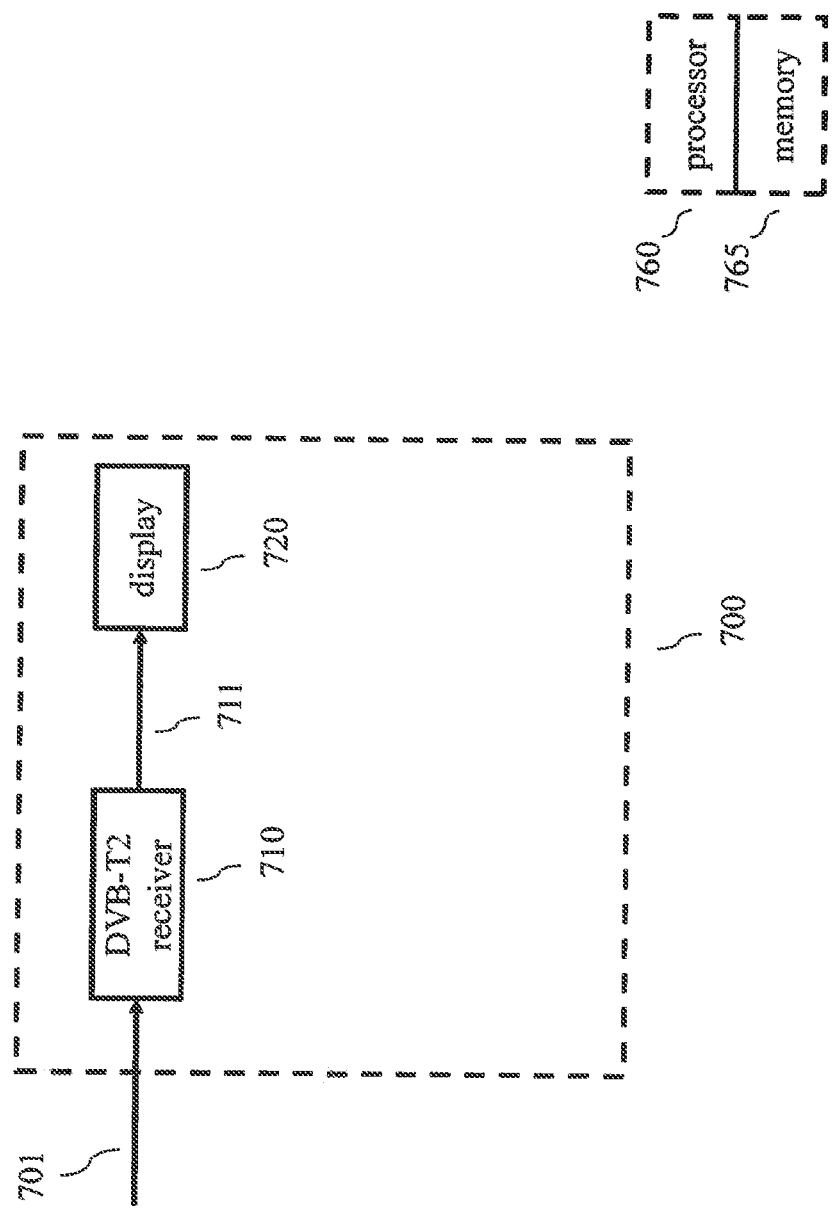
FIG. 8 shows an illustrative embodiment of a device, or receiver, in accordance with the principles of the invention.

A high-level block diagram of an illustrative device, or receiver, in accordance with the principles of the invention is shown in FIG. 8. Device 700 (e.g., a television) includes a DVB-T2 receiver 710 and a display 720. DVB-T2 receiver 710 receives a broadcast DVB-T2 signal 701 (e.g., via an antenna not shown) for processing to recover therefrom, e.g., an HDTV (high definition TV) video signal for application to display 720 for viewing video content thereon. In addition, DVB-T2 receiver 710 retrieves the L1 pre-signaling table for use of the FILTER field in accordance with the principles of the invention for selectively processing received OFDM symbols. Device 700 is a processor-based system and includes one, or more, processors and associated memory as represented by processor 760 and memory 765 shown in the form of dashed boxes in FIG. 8. In this context, computer programs, or software, (e.g., representing the flow chart of FIG. 10) are stored in memory 765 for execution by processor 760. As noted, processor 760 is representative of one, or more, stored-program control processors and these do not have to be dedicated to any one particular function of device 700, e.g., processor 760 may also control other functions of the device. Memory 765 is representative of any storage device, e.g., random-access memory (RAM), read-only memory (ROM), etc.; may be internal and/or external to the device; and is volatile and/or non-volatile as necessary.

Figure 9:
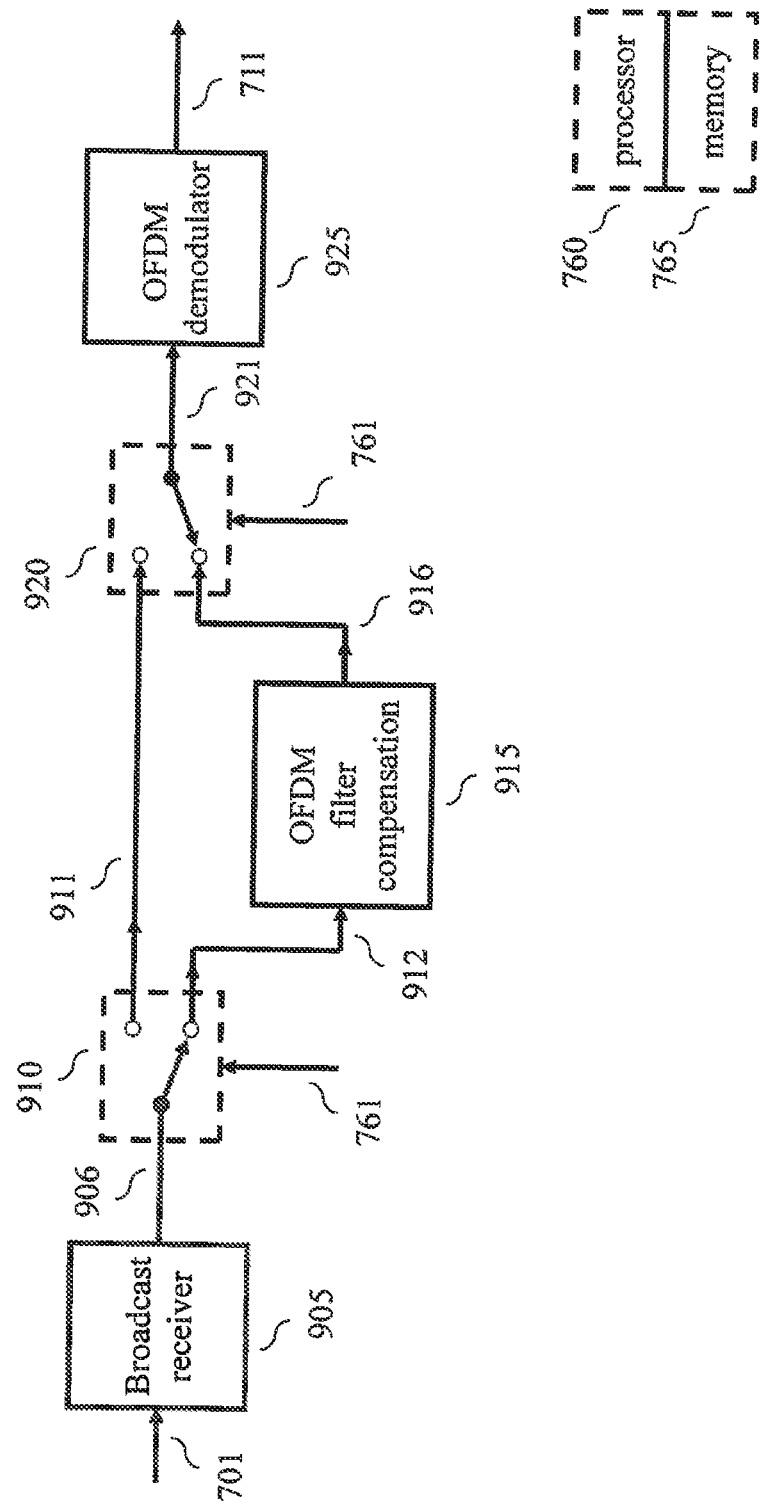
FIG. 9 shows a portion of an illustrative DVB-T2 receiver in accordance with the principles of the invention.

Turning now to FIG. 9 an illustrative embodiment of the invention is shown for selectively processing the OFDM symbols in case the OFDM symbols have been filtered. Only that portion of DVB-T2 receiver 710 relevant to the inventive concept is shown. DVB-T2 receiver 710 comprises broadcast receiver 905, switches 910 and 920, OFDM filter compensation 915 and OFDM demodulator 925. As noted above for FIG. 8, one, or more, of the functions of FIG. 9 can be implemented in software via processor 760 and memory 765. Broadcast receiver 905 receives a DVB-T2 broadcast signal from an rf channel and downconverts the signal to provide received OFDM symbols 906, which are formatted in superframes as shown in FIG. 1. Received OFDM symbols 906 is applied to switch 910. Processor 760 determines the value of the FILTER field in the L1 pre-signaling table and suitably controls switches 910 and 920 via control signal 761. If the FILTER field indicates the received OFDM symbols have been OFDM filtered, then processor 760 controls switch 910 to apply the received OFDM symbols to OFDM filter compensation 915. The later performs the inverse function of OFDM filter 215 of FIG. 4. OFDM filter compensation 915 then applies the compensated OFDM symbols 916 to switch 920, which also under the control of control signal 761, provides the compensated OFDM symbols to OFDM demodulator 925 via signal path 921. As noted earlier, it could be the case that OFDM filter 215 of FIG. 4 is a bank of different filters. In this case, the FILTER field will indicate to the receiver which complimentary OFDM filter compensation to use.

On the other hand, if the FILTER field does not indicate that the received OFDM symbols have been OFDM filtered, processor 760 controls switches 910 and 920 via control signal 761 such that received OFDM symbols 906 are applied to OFDM demodulator 925 without OFDM filter compensation. OFDM demodulator 925 receives the OFDM symbols (compensated or not) via signal path 921 and provides demodulated data 711 from which, e.g., an HDTV video signal is recovered for application to display 720 for viewing video content thereon.

As noted earlier with respect to FIG. 4, Elements 910 and 920 of FIG. 9 are designated as switches. However, it should be noted that these do not have to be actual switches and, rather, provide a visual illustration of a switching function for ease of explanation.

Figure 10:
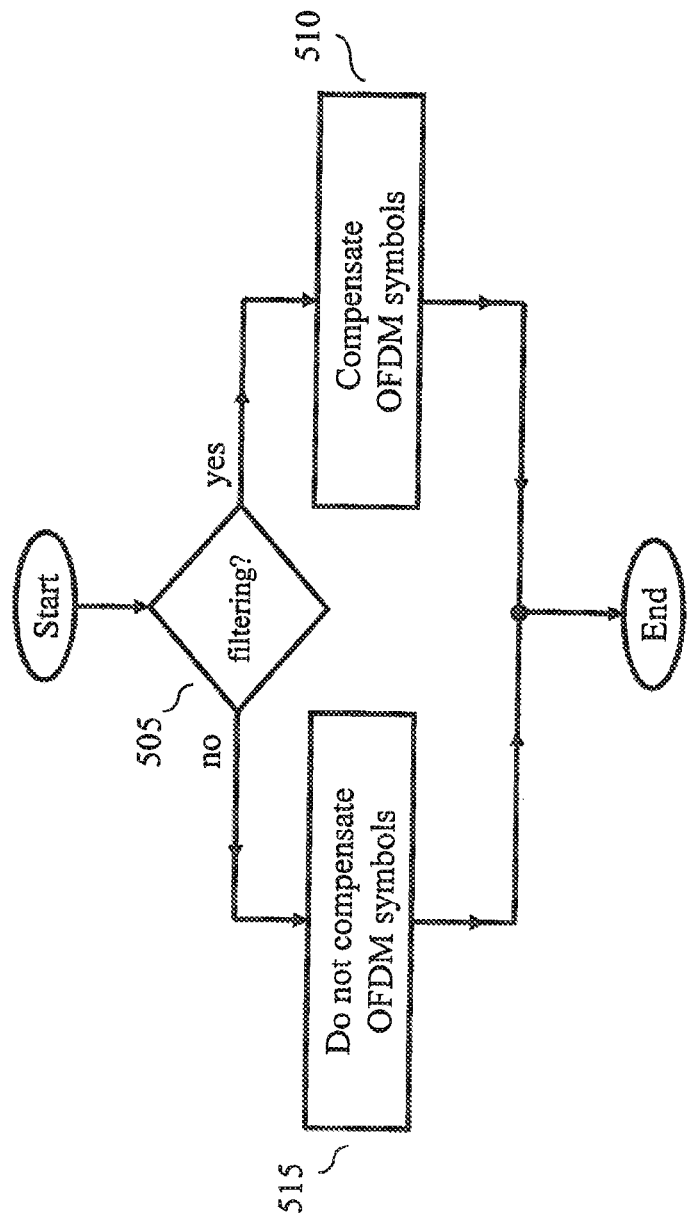
FIG. 10 shows an illustrative flow chart for use in a DVB-T2 receiver in accordance with the principles of the invention.

Referring now to FIG. 10, an illustrative flow chart is shown for use in a receiver in accordance with the principles of the invention. In step 505, processor 760 determines if filtering was performed on the received OFDM symbols from the FILTER field of the received L1 pre-signaling table for a received T2 frame. If filtering was performed, processor 760 controls switches 910 and 920, via control signal 761, to compensate for the filtering, via OFDM filter compensation 915, before application of the OFDM symbols to OFDM demodulator 925 in step 510. However, if filtering was not performed, processor 760 controls switches 910 and 920, via control signal 761, to apply received OFDM symbols 906 to OFDM demodulator 925 without performing any OFDM filter compensation in step 515.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. It is therefore to be understood that numerous modifications may be made to the illustrative embodiments and that other arrangements may be devised without departing from the spirit and scope of the present invention.

The invention claimed is:

1. A receiver comprising:
an orthogonal frequency division multiplexed (OFDM) receiver for receiving an OFDM broadcast signal, the received OFDM broadcast signal conveying frames, each frame comprising a preamble portion and a following data portion; wherein at least one preamble portion conveys information to the receiver if a following data portion has, or has not, been filtered prior to transmission; and
a processor, responsive to the information if a following data portion has, or has not, been filtered prior to transmission, for controlling a filter to process the following data portion to compensate for being filtered prior to transmission.

2. The receiver of claim 1, wherein the OFDM broadcast signal is formatted in accordance with DVB-T2.

3. The receiver of claim 2, wherein each frame is a T2 frame and the preamble portion is an L1 pre-signaling table.

4. A method for use in a receiver, the method comprising:
receiving an orthogonal frequency division multiplexed (OFDM) broadcast signal, the received OFDM broadcast signal conveying frames, each frame comprising a preamble portion and a following data portion; wherein at least one preamble portion conveys information to the receiver if a following data portion has, or has not, been filtered prior to transmission; and
responsive to the information if a following data portion has, or has not, been filtered prior to transmission, filtering the following data portion to compensate for being filtered prior to transmission.

5. The method of claim 4, wherein the OFDM broadcast signal is formatted in accordance with DVB-T2.

6. The method of claim 5, wherein each frame is a T2 frame and the preamble portion is an L1 pre-signaling table.

\* \* \* \* \*